Figure 1:
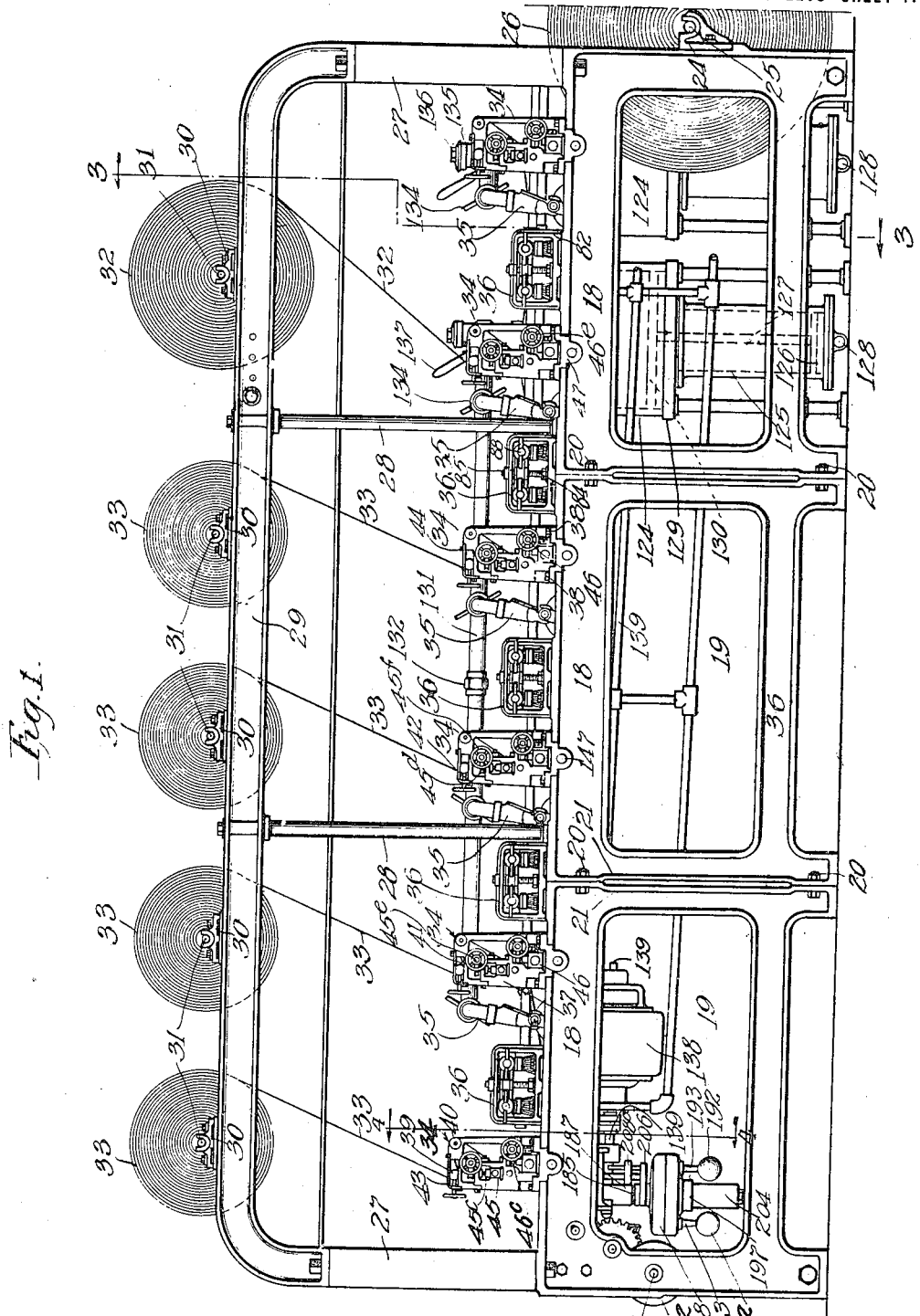

J. P. RIVETT.
FLONG MACHINE.
APPLICATION FILED FEB. 8, 1915.

1,193,615.

Patented Aug. 8, 1916.
8 SHEETS—SHEET 1.

Witnesses:
Arthur W. Carlson
Robert H. Weir

Inventor:
Joseph P. Rivett
by Jno. G. Elliott
Atty.

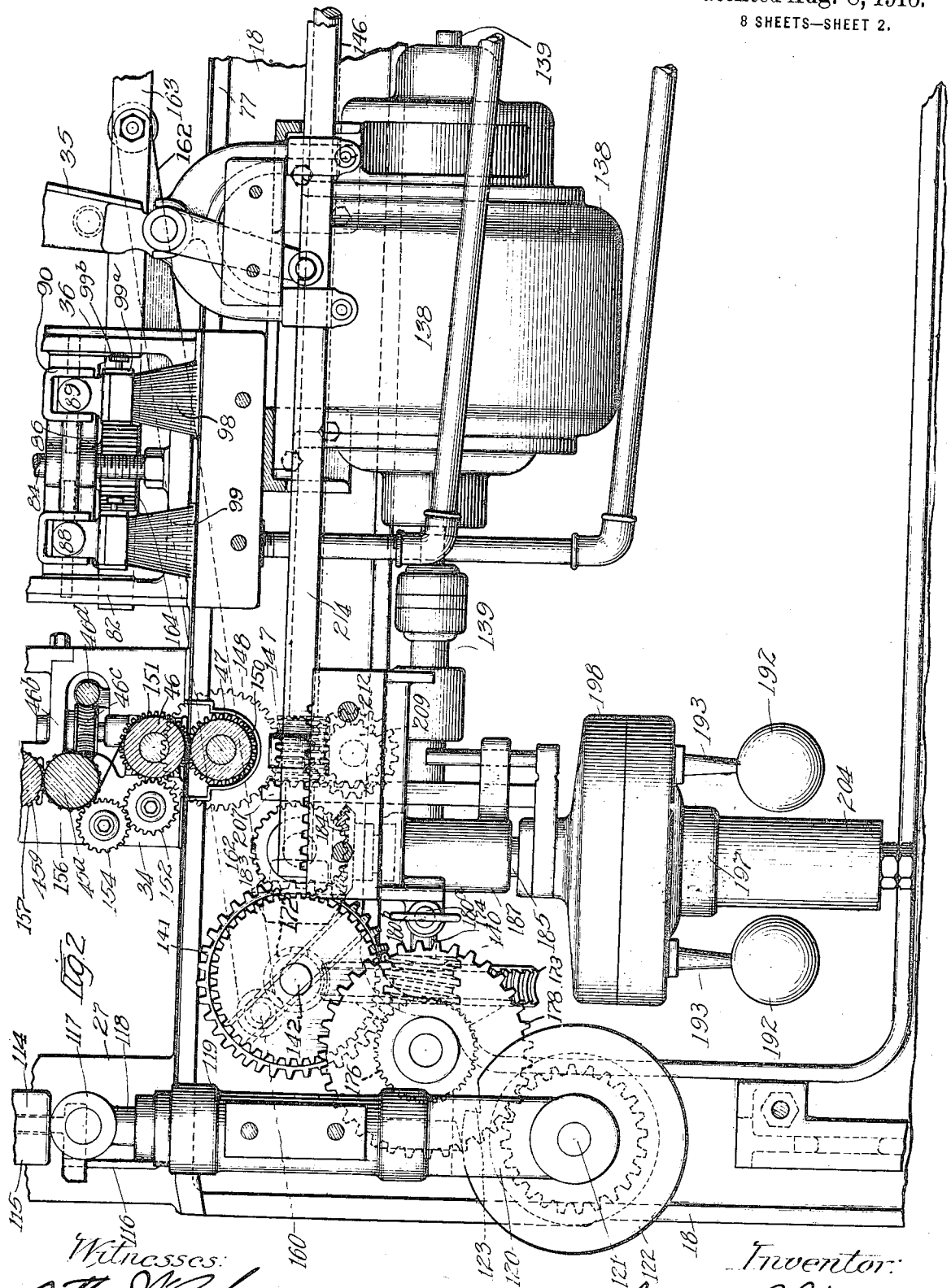

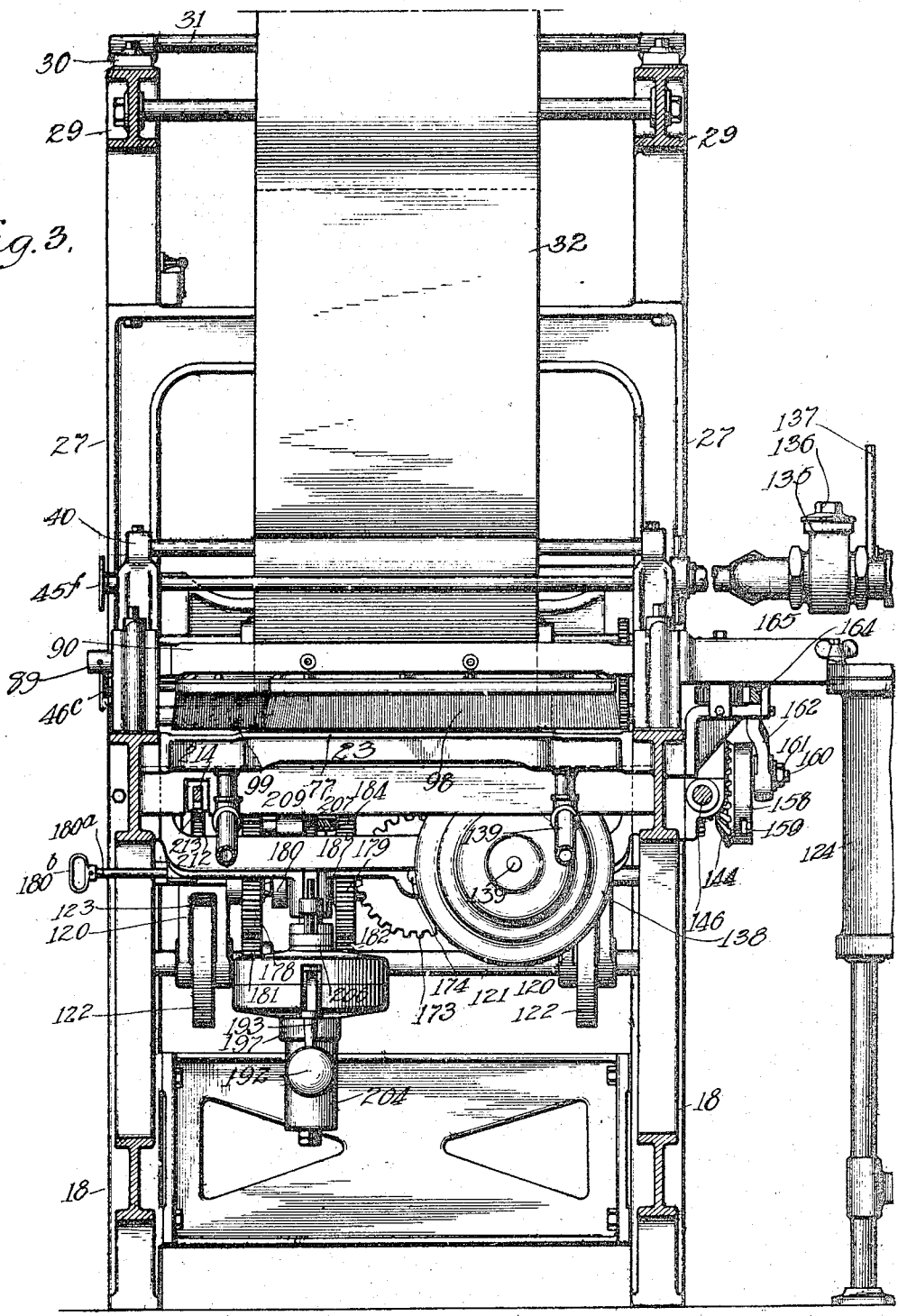

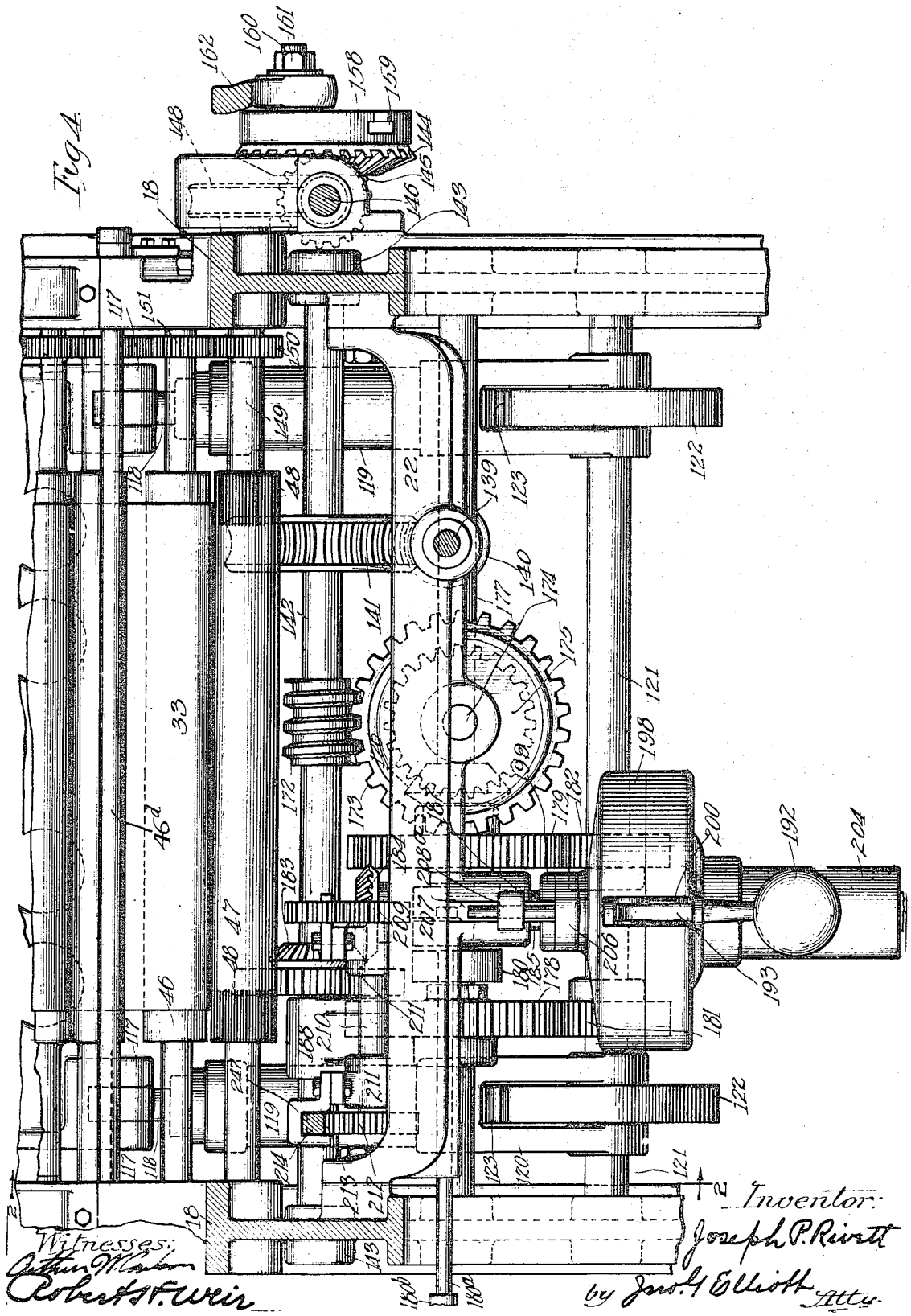

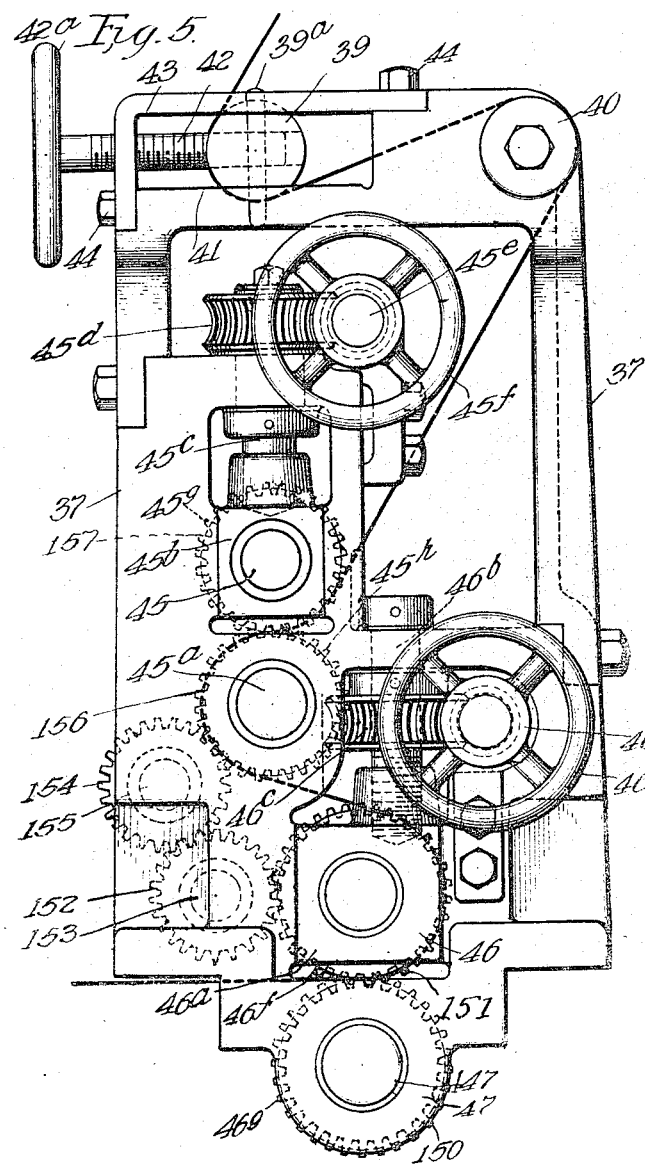

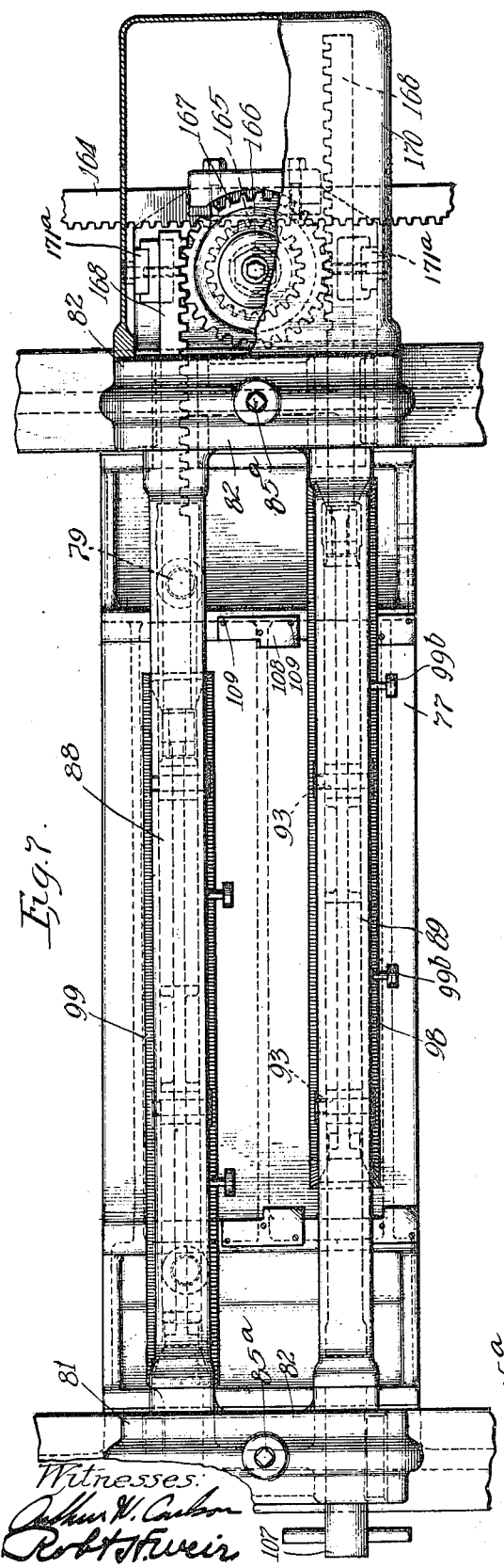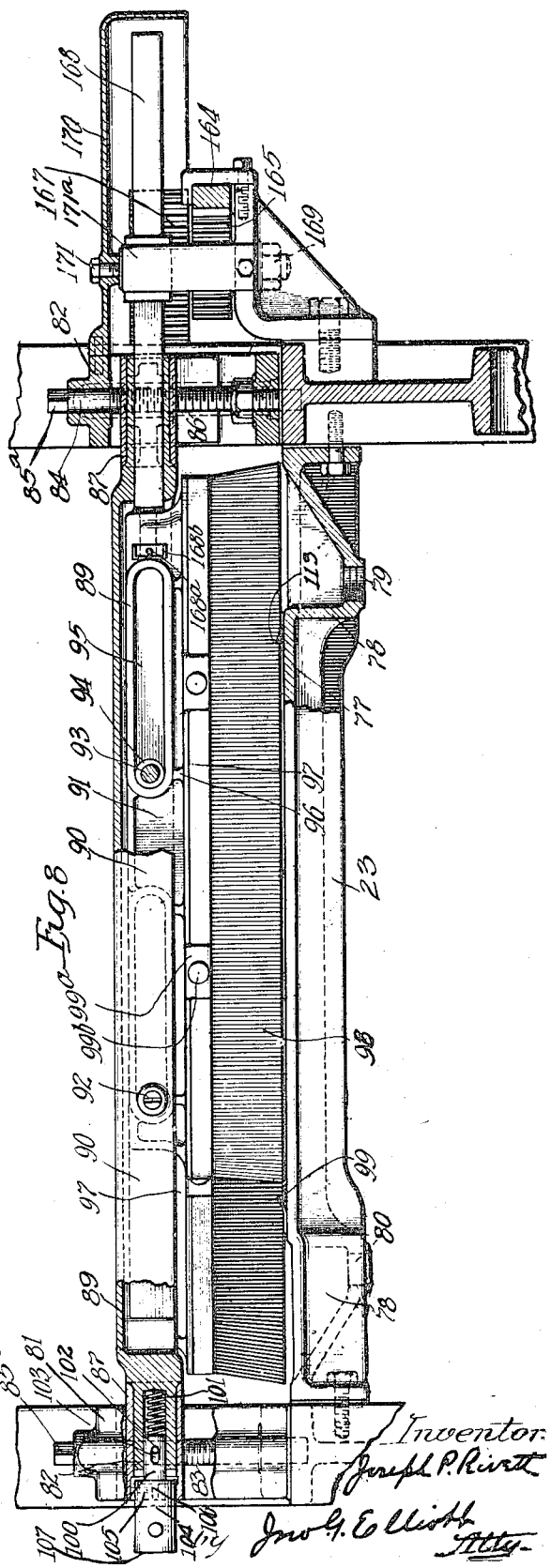

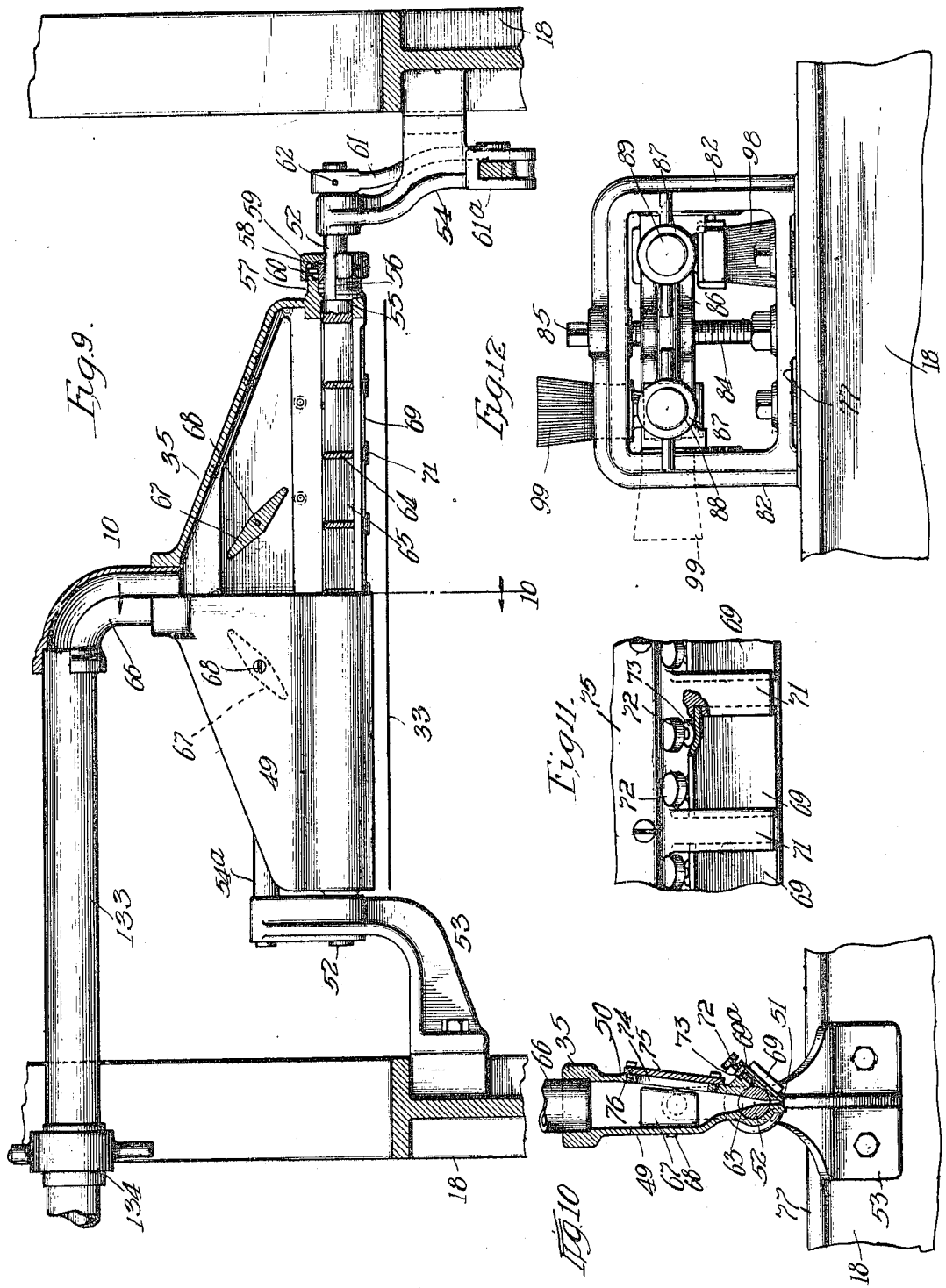

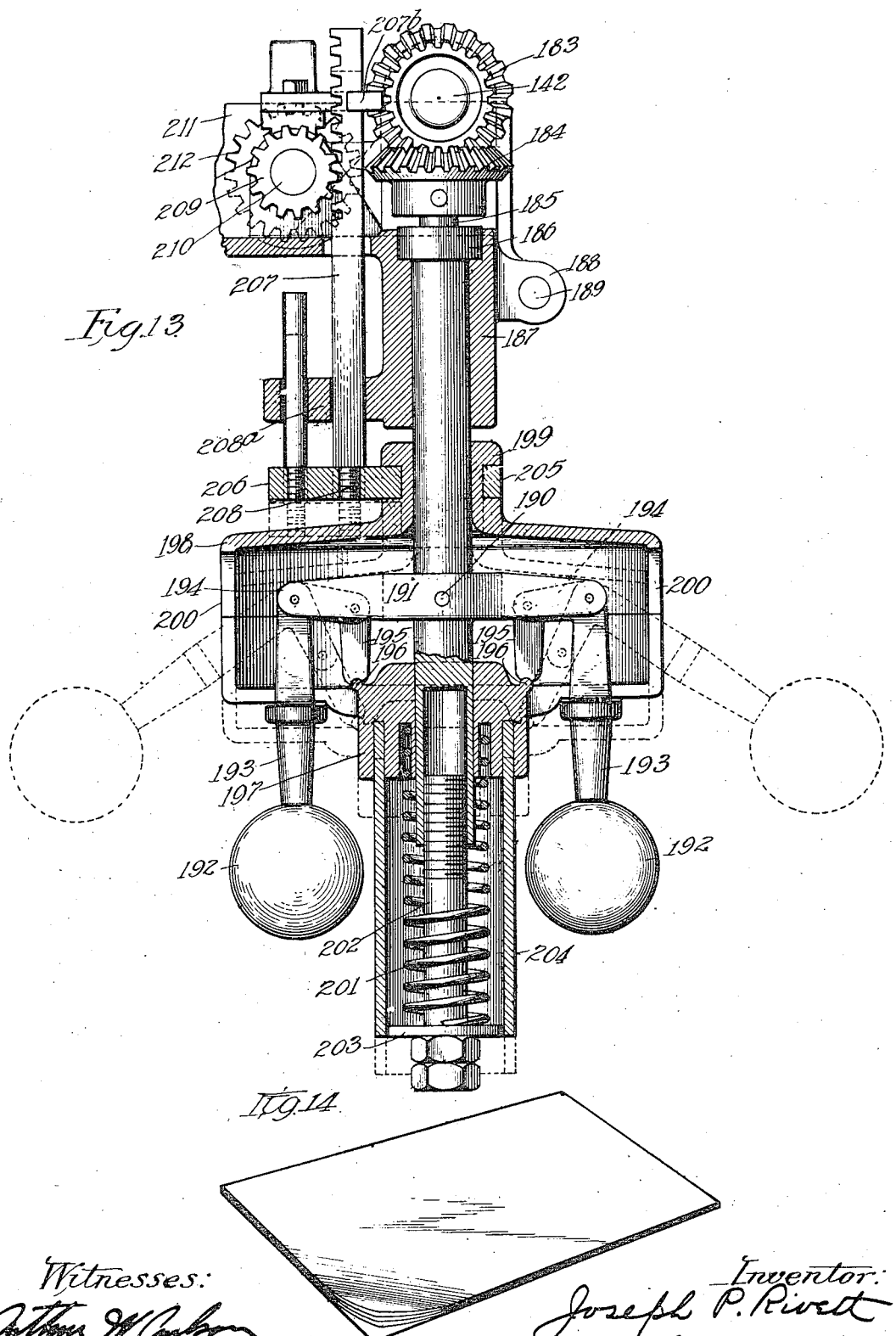

UNITED STATES PATENT OFFICE.

JOSEPH P. RIVETT, OF CHICAGO, ILLINOIS.

FLONG-MACHINE.

1,193,615.  Specification of Letters Patent.  Patented Aug. 8, 1916.

Application filed February 8, 1915. Serial No. 6,888.

*To all whom it may concern:*

Be it known that I, JOSEPH P. RIVETT, a citizen of the United States, and resident of Chicago, in the county of Cook and State of Illinois, have invented certain new and useful Improvements in Flong-Machines, of which the following is a full, clear, and exact specification.

This invention relates to improvements in machines for making flongs for stereotype purposes, in which heretofore the several sheets of paper from which a flong is made are either simultaneously or separately passed through and bodily immersed in the paste for securing them together, and passed thence directly between one or more pairs of squeeze rollers for removing the thereby unavoidable surplus of paste therefrom, which surplus is thereafter a waste product.

Flongs necessarily are of a spongy, somewhat thick paper backing, a plurality of thin tissue sheets, and preferably a supplemental backing thinner and even more spongy than the backing proper, but substantially thicker than any of the tissue sheets. In the production of flongs continuously from rolls of paper, it is however found in practice that as soon as the tissue sheets are wet with paste, they lose all of their strength, thereby making it impractical for the wind-up rollers to draw or feed the web through the paste from the supply rollers, or to pass the previously submerged tissues between the squeeze rolls without either cracking or breaking the surface, and perhaps the underlying tissue sheets, and in any event not infrequently so wrinkling the tissues, that the made up flong must be cast aside as a waste product.

In order to secure anything approximating a perfect stereotype from a flong, the flong must not be too "lean" with paste, else the impression from the stereotype plate will not be deep enough or sharp enough for practical purpose; neither must the flong be too "fat" with paste, nor contain a lump of paste at any point of its surface receiving the stereotype impression, for the reason that the surface tissue will be cracked by the pressure of the paste from the impression force, with the result that when molding from the flong the hot metal will stick to the flong, and thereby destroy the flong for further use, if not producing an imperfect casting.

Pressure rolls as a means for removing surplus paste from between the several sheets for forming a flong are not only unsatisfactory because of the pull they exert upon the sheets after they are wet from the paste, and as must be for feeding the wet sheets through the machine, but for the further reason that it is practically impossible to adjust or maintain them in adjustment preventing the flong from being either too fat or too lean. This is particularly true in flong machines in which the space between the squeeze rolls forms a reservoir for the paste through which the sheets are severally conducted, and furthermore it is all but impossible to so conduct several sheets through the machine in a manner as to prevent one or more sheets from overlapping each other at the edges, and also from wrinkling one or more of the tissue sheets during the squeezing operation of the rollers for removing surplus paste from and between the sheets, and this particularly with regard to the surface tissue sheet directly exposed as it is to the friction of the surface of the opposing squeeze roller.

The prime object of this invention is a machine continuously making flongs without limit as to the number or the thinness of its tissue sheets supported from as many rolls of paper as there are sheets, and as may be necessary, without immersing any of the sheets in paste, and in such a manner that it is for the first time possible and practical to uniformly, rapidly and continuously produce flongs, neither too fat nor too lean, and at the same time with absolute certainty exclude surplus paste therefrom at every point throughout the surface over layer, and with the employment of a minimum amount of paste necessary therefor.

A further object of this invention is a means by which the minimum amount of paste necessary to produce a perfect flong is uniformly incorporated with every fiber throughout the entire surface of every sheet, and into the fibers of every tissue sheet before any of the sheets are brought together, and in such a manner that it is impossible for air blisters to occur between any of the sheets, and that adjacent sheets may be perfectly united by the paste.

Another object of this invention is a machine for making flongs in which every sheet from which it is made except, possibly the backing sheet, is drawn and thereby fed through the machine by means of rolls, between gripping the opposite and selvage edges of their respective sheets, and also to have the draw rolls provided with means for separately adjusting and subsequently maintaining the several sheets in perfect alinement with each other, throughout the process of pasting and uniting them to form a completed flong.

A further object of this invention is in connection with reciprocating brushes for spreading the paste on the several paper strips, to provide a means by which the edges of the strips may be isolated from engagement with the brushes and at the same time provide means for directing the paper through the machine past the brushes.

A further object of this invention is a means by which the paste may be applied in a predetermined regulated quantity to but one surface of the strips of paper for a flong, and subsequently distributed and forced into the fibers of every strip uniformly throughout its surface, and lumps of paste, if there be any, discharged from said surface before the sheets are united.

Another object of this invention is a flong machine in which means are provided whereby during the operation of the device for drawing any number of strips of paper through the machine for applying and distributing the paste thereto, for forcibly distributing and incorporating the paste with the several strips and for severing the strip into separate flongs, may simultaneously, instantly be brought to a standstill, and as instantly be again operated from their position of stoppage without injury to any of the parts or to any of the sheets of paper in their feeding position through the machine.

A still further object of this invention is to supply the several strips of paper from which a flong is made with paste under air pressure, from which such air is excluded.

Another object of this invention is to have the prerequisite quantity of paste for a flong delivered respectively upon the several sheets of which it is formed, and by means so constructed and operating that the supply of paste may be determined and regulated either by mechanical devices, or by air pressure, as may be desired or necessary at the time.

More specifically stated, one object of this invention is a flong machine in which the paste is applied in spaced apart ribbon like strips so to speak, to one surface of every strip, of which the flong may be made, and the quantity of paste in such ribbon be predetermined and regulated either by mechanical means or by air pressure from its source of supply.

My invention also includes means by which the spreading brushes for the paste may be easily and conveniently swung upwardly away from their opposing strips of paper, and be removable from their holders, and also means whereby convenient access may be had to the air tight reservoir for the paste, its connections with the nozzles from which the paste is delivered directly upon the strips of paper for cleansing and filling purposes.

With these ends in view, my invention finds embodiment in certain features of novelty in the construction, combination and arrangement of parts by which the said objects and certain other objects are attained, all as hereinafter fully described with reference to the accompanying drawings, and more particularly pointed out in the claims.

In said drawings:—Figure 1 is an illustration in side elevation of a flong machine in which my invention and inventions find embodiment. Fig. 2 is an enlarged detail side elevation of the rear end of the machine in which one side of the frame is removed, and one pair of draw-rolls and their accompanying guide rolls are shown in cross-section. Fig. 3 is a transverse section through the machine taken on the line 3—3 of Fig. 1. Fig. 4 is a transverse section taken on the line 4—4 of Fig. 1. Fig. 5 is an enlarged detail end elevation of one of the several banks of rolls consisting of an adjustable guide rod or roll, a pair of draw or feed rolls, and pressure rolls, and means for their several adjustments. Fig. 6 is a top plan view of the bank of rolls shown in Fig. 5. Fig. 7 is an enlarged top plan view of one of the several pairs of the reciprocating paste spreading brushes. Fig. 8 is an enlarged side elevation of the brush structure shown in Fig. 7, partly in section. Fig. 9 is an enlarged elevation of one of the nozzles from which the paste is directly discharged upon the strips of paper. Fig. 10 is a transverse section on the line 10—10 of Fig. 9. Fig. 11 is a fractional enlarged elevation of the nozzle shown in cross-section in Figs. 9 and 10. Fig. 12 is an end elevation of one pair of the several paste spreading brushes, with one of the brushes shown in its operative position, and the other in the position swung upwardly therefrom. Fig. 13 is an enlarged detail of the governor, automatically regulating the discharge of paste from the nozzle. Fig. 14 is a reduced perspective view of a four sheet tissue flong and its backing, made by the machine. Fig. 15 is a top plan view of one of the guide plates at the opposite edges of the several sheets of paper. Fig. 16 is a transverse section taken on the line 16—16 of Fig. 15, and Fig. 17 is a transverse section taken on the line 17—17 of Fig. 15.

Similar characters of reference indicate the same parts in the several figures of the drawings.

The base frame of the machine may be of any construction adapted for supporting the mechanism hereinafter described, and as shown in the drawings consists of opposing sectional sides 18, each of which sections is provided with openings 19 for access therethrough to the mechanism supported thereby, which several sections are secured together by means of bolts 20, passing through opposing flanges 21, the opposite sides of the frame being connected and braced by means of any suitable number of cross-bars, such for example, as are shown at 22 in Fig. 4, and 23 in Figs. 3 and 8. Secured to the sides of the frame at the feeding end of the machine are brackets 24 forming bearings for a removable shaft 25 of a roll of backing paper 26, the top edges of which side frames form supports for end posts 27—27 and rods 28—28 supporting on their upper ends parallel side bars 29.

Mounted upon the opposing top side bars 29 at intervals of each other are a number of bearings 30 for as many shafts 31, as there are rolls of paper, for example a roll of supplemental backing paper 32, and rolls of tissue paper 33, the unwinding of each of which is resisted by means of any old and well known adjustable tension device (not shown) suitable for the purpose. In the operation of the machine, the strips of paper from as many of these rolls as there are to be layers of paper in the flong, are each conducted over and through a bank of rolls 34, thence below a paste discharging nozzle 35 over a table, beneath a pair of movable brushes 36 spreading the paste from the nozzle over the surface of the passing strip of paper, and forcing it into the fibers thereof. In other words, the function of each bank of rolls provides a means for fixing the direction of the path of movement of a web of paper passing therethrough, drawing and thereby feeding the web through the machine, and compressing together the pasted sheets, after each nozzle has applied to the surface thereof a predetermined amount of paste followed by the applied paste being uniformly spread by the brushes opposing the surface thereof, and forcing the paste into the fibers of the paper. As these several banks comprise guide, draw and pressure rolls, the nozzles and brush structures of which are identically alike both in construction and operation, and in view of this fact and that one of each forms a unit of the whole for separately directing, drawing, applying the paste to, and thereafter spreading and forcing the paste into the fibers of paper from a single and opposing roll, it will only be necessary for the purpose of clearness in description to describe in detail but one each of these several devices.

The guide rods, draw and compression rolls constituting each bank of rolls 34 are supported in suitable upright frame-like brackets 3 mounted upon the top and at the opposite sides of the base frame, and secured thereto by any suitable means, as for example, as shown in Fig. 1 by means of bolts 38.

The paper 35 from the opposing roll for each bank of rolls 34 (see Figs. 5 and 6) first passes partly around a movable guide, which may be a roll or rod 59, and thence over a fixed guide rod or roll 40, the guide rod 39 being pivoted at one end to the adjacent bracket as indicated at 39$^a$, but at its opposite end has a sliding bearing on an upper edge of the bracket 37 as indicated at 41, and is adjustable back and forth therein by means of a screw 42, provided with a hand wheel 42$^a$, which screw works in an angular bracket 43 secured to the bracket 37 by means of screws 44. This swinging movement of the rod 39 provides a means for directing and maintaining every web of paper from the rolls in the same path of movement throughout the machine, and therefore in perfect register with each other. If, for example the roll produces a uniform tension throughout the width of the paper passing under and partly around it, the path of movement of the paper from the roll will be in a line at a right angle to the axis of the roll, but on the other hand, if the roll produces a greater tension toward one edge of the paper than at the other, the path of movement of the paper will be at an oblique angle to the axis of the roll, and its direction accordingly as the roll may produce a greater tension toward one side of the paper than toward the other side. It will therefore now be understood that by the employment of an adjustable swinging rod or roll, there is present a convenient and effective means by which every web of paper for a flong may be continuously directed in the same path of movement, and if need be in a path of movement at an exact right angle to the axis of the rod 39, and over as many guide rods, draw rolls and pressure rolls as may be in the machine, and the perfect registering over every strip of paper be accordingly maintained. The web of paper, as will be seen in Fig. 5 passes from under the adjustable guide rod 39 over the fixed guide rod 40, and thence downwardly between a pair of draw or feed rolls 45 and 45$^a$, the latter of which is journaled at its opposite ends in fixed end bearings in the brackets 37. The roll 45, however, is journaled at each end in adjustable boxes 45$^b$, suspended from the frame by a shaft 45$^a$ on the upper end of which is a gear 45$^d$ meshing with a worm screw 45$^e$ provided with a hand wheel 45$^f$ on the turning of which through the medium of the worm screw and gear the upper roll 45 may be moved toward and away from the lower opposing roll 45ª, and the pressure of these two rolls upon the web or webs fastened between them, be accordingly increased or diminished and adjusted to differing thicknesses of webs. Draw rolls 45—45ª are respectively provided at one end with gear wheels 45ᵍ and 45ʰ, meshing with each other and driven as hereinafter described. The function of the rolls 45 and 45ª is to draw the paper over the guide rods 39 and 40 and feed it downwardly to pressure rolls 46 and 47, one of which, 47, is journaled in fixed bearings in the bracket 37, and the other in sliding boxes 46ª at the opposite ends thereof in the bracket 37, and which are suspended from the bracket 37 by means of a bolt 46ᵇ, on which is a worm gear 46ᶜ meshing with a worm 46ᵈ operated by a hand wheel 46ᵉ for adjusting the pressure roll 46 toward and from its opposing fixed roll 47. Compression rolls 46 and 47 are also respectively provided at one end with gears 46ᶠ and 46ᵍ, meshing with each other and driven as hereinafter described.

On referring to Fig. 4 it will now be observed that the lower fixed roll 47 has a milled surface 48 adjacent its ends as a means for gripping the edge or selvage of the several sheets for forming a flong, and hold them respectively against their opposing upper roll 46, and whereby there is provided a surface by which the several sheets before and after they are united are positively fed through the machine to and between severing blades hereinafter described, concurrently with their being compressed between these rolls, and without marring or otherwise injuring the operative surface of the severed flongs.

With the exception of the bank of draw rolls 34 at the delivery end of the machine there is next rearwardly of every bank of guide and draw rolls, suitably spaced therefrom, one of the nozzles 35, which, see Figs. 9 and 10, extends substantially across the machine, and has downwardly converging side walls 49—50, and are but separated at their apex by a narrow slit 51 next above which, and passing through and between the walls of the nozzle is a supporting shaft 52 therefor, one end of which is journaled in open slotted bracket 53, and the other end in a similar bracket 54, respectively secured by any suitable means to the opposing sides 18—18 of the base frame, and may be further supported by a pin 54ª projecting therefrom through the bracket 53. The shaft 52 is reduced at one end to provide a shoulder 55, on which reduced portion is sleeved a bushing 56 screw-threaded in a hub 57 cast with, or otherwise secured to the nozzle, the bushing being provided with a flange 58 forming a grip for a wrench to remove it from the hub, which bushing is inclosed by a cap 59 screw-threaded upon the hub 57 for containing packing rings 60 to form a paste tight joint around the shaft.

On the end of the shaft 52 between the bracket 54 and the side of the machine, is an arm 61 secured thereto by means of a pin or screw, as may be, 62, for oscillating the shaft, as will hereinafter be more particularly described, said arm 61 being fitted as its apex with a stud 61ª, engaging a slot in the sliding bar 214. By disengaging the coupling 134, the nozzle for cleaning, can readily be lifted from a U-shaped bearing in the brackets 53 and 54 and from sliding bar 214.

Shaft 52 is provided longitudinally with a slot 63, the walls of which converge to a narrow opening adapted to register with the slit 51 in the nozzle, which longitudinal slot is transversely divided by a number of partitions 64 into a corresponding number of paste containing receptacles 65, supplied by means, and from a source hereinafter described, through an elbow 66 discharging into the top of the nozzle about centrally of its length, and distributed toward the opposite ends thereof by means of deflecting plates 67—67 adjustably secured at the desired angle by screws or bolts 68 passing through the side walls of the nozzle.

As a means for mechanically regulating the discharge of paste from the respective chambers 65 of the nozzle, the slot outlets for these chambers are each opposed by a blade 69, adapted to be moved at an oblique angle across and from its opposing slot, and to which end the blade 69 is opposed to an inclined bearing surface extending lengthwise of the wall 50 of the nozzle, and against which wall they are held by means of a bar 70 provided with tongues 71 projecting across and laterally closing the space between and forming an outer bearing for the ends of the blades 69. Adjacent these blades and secured in the wall 50 are one or more thumb screws 72 provided with a collar or flange 73 projecting into an opposing transverse groove 69ª in each blade, where by the raising and lowering of the screw the blades are correspondingly moved across and thereby mechanically regulate the discharge of the paste from the nozzle as the several webs of paper pass thereunder.

One side wall of the nozzle, and as shown in the drawing the side wall 50, is provided with a manhole 74 provided with a removable cover 75, between which cover and the side wall 50 may be a packing ring 76 for forming a tight joint preventing the escape of paste therethrough.

It is now observed that the paste will be discharged in ribbon like form upon the passing sheet of paper from between the edge of each blade, and the opposing wall 49 of the nozzle, the width of the ribbon being determined by the length of the adjustable blade, and its thickness by the adjustment of the edge of each blade from and toward that wall. There may be eight of the paste receptacles 65, and a separate blade for every receptacle as indicated in the drawings for applying these comparatively thin ribbons of paste simultaneously to the surface of the greatest width of web of paper for which any particular machine is adapted, and so that on closing one or more of these blade like gates, the machine is adapted for forming flongs, the webs of which are accordingly narrow. In some instances the application of but four ribbons of paste is necessary to the passing web of paper, in which event every other gate is closed and accordingly when but three ribbons of paste are necessary. The main object, however, in having a large number of gates is to provide for practically an unlimited as well as limited mass of paste in ribbon like form, as may be necessary for any of the uses to which the machine may be adapted. Quickly following the application of the paste as indicated, and above described the webs of paper pass, see Figs. 2, 3, 7, 8 and 12, over and upon a table 77, which table is supported by one of the transverse bars 23 of the base frame, and may, as shown in Fig. 8 be cast therewith, and have accordingly formed at its opposite end gutters 78—78 provided with openings 79—80 for convenience of cleansing of paste that may be discharged therein by reciprocating brushes now to be described.

Upon the top of the side bars of the main frame at opposite sides thereof are mounted arch like brackets 81—82, each of which provide end bearings for upright screw-threaded turn bolts 83—84, angular in cross-section at their upper ends as indicated at 85ª, 85ª for turning them with a suitable key, (not shown) the screw-threaded portion of which bolts work in and, see Fig. 12, suspend head blocks 86 at opposite sides of the machine, the ends of which project into and are confined by grooves (not shown) in the opposing legs of their respective brackets 81—82 for guiding the head blocks vertically when moved up and down by their respective screw-threaded shafts 83—84.

Journaled at their opposite ends in bushings 87 passing through the head blocks 86 are parallel hollow rocking bars 88 and 89, the opposing side flanges 90 and 91 of which are connected by means of screw bolts 92 and 93 at intervals of each other on each of which bolts is a roller 94 having the bearing in a longitudinal slot 95, see Figs. 2 and 8, in lugs 96 projecting upwardly from brush holders 97, one for each of two brushes 98 and 99, and whereby the brushes are suspended and may be reciprocated, longitudinally, and thereby transversely across the paste upon the surface of the web of paper supported by and traveling across the table 77. As a means for removably securing the brushes to their holders, the latter are provided at intervals with perforated clips 99ª for the passage therethrough into the backing of the brush of screws 99ᵇ, projecting into the side edges of the back for the brush structure. In order to provide a simple and convenient means for locking the brush holders in their elevated position, one end thereof, see Fig. 8 is cored out to receive a plunger 100 seated against a spring 101 and secured to the brush holder by means of a pin 102 on which the plunger is slidable by means of a slot 103 therein. On the outer end of this plunger is a sleeve 104 connected with a plunger by a common form of bayonet joint, as for example by means of a pin 105, projecting into an angular groove 106 in the plunger, and provided in its outer end with a pin forming a handle 107.

The function of the brushes 98 and 99 is not only to uniformly spread the ribbons of paste over the surface of, but to as uniformly force the paste into the fibers of the web of paper passing beneath them, the degree of pressure for this purpose being determined and regulated, and as may be with perfect accuracy by the vertical adjustment of their bearings as may be through the medium of the screws 85—85, the brushes being alternately reciprocated by a mechanism hereinafter described.

As a simple and effective means for preventing the brushes from catching on and tearing the edges of the strip of paper passing beneath them, and particularly when of tissue paper, the pasting table is provided at opposite ends with (see Figs. 7, 8, 15 and 16) a plate 108 mounted thereon and secured by means of screws or other suitable devices (not shown) passing through perforations 109 therein into the table 77. The underside of these guide plates 108 are cut away as indicated at 110, to form lips 111—112 overlapping the adjacent edges of the passing strip of paper, and thereby isolating these edges from engagement with the brushes, the lip 112 at the forward end of the plate being wider and therefore extending farther over the edges of the paper than does the lip 111, in order that the small amount of paste piled against the edge of the plate by the opposing brush may be spread by the operation of the second brush. For obtaining the best results the lips should be and are, as shown in the drawings, beveled on top to bring them to a knife edge for so reducing the accumulating paste so that when spread and forced into the fibers of paper by the second brush, the applied paste shall be uniform throughout its entire width. As shown the outer corner of the lip 112 is preferably bent upwardly as indicated at 130

113 as a means for directing the moving strip of paper beneath it.

Before describing the mechanism for actuating and producing a synchronous operation of the device for directing and feeding paper from the several rolls through the machine, for feeding the paste thereto, and for forcing the paste into the fibers and spreading it uniformly over the surface of passing strips of paper, it should first be observed that the supply of paste for the last and upper layer of tissue paper is wholly from the upper surface of the next preceding web of paper, and that the continuous flong is completed following its passage between the last bank of rolls, and whereupon and from which the flongs are successively separated by a cutting blade mounted upon the machine, which will now be described.

For severing the flongs into suitable lengths, see Fig. 14, before their discharge from the machine, there is between the last pair of opposing uprights of the machine, a common construction of cutting devices (see Figs. 2 and 4) consisting of a head-block or frame 114 confined and guided in vertical grooves either in the frame standards or in bars 115 fastened thereto, as indicated in Fig. 2, to which is respectively secured by usual means, a cutter blade 116 extending across and suspended above the path of movement of the completed, continuous flong structure discharging from between the pressure rolls of the adjacent bank of rolls. Depending from the sliding head-block 114 are parallel lugs 117 between which is pivoted a plunger 118 in a cylinder 119, the lower end of which is provided with parallel lugs 120, through which loosely passes a rotating shaft 121, on which and between the lugs is secured notched wheels 122, the notch in each of which is indicated at 123. Supported as the cutter blade 116 is by the sliding frame, it will now be seen that the cutter is held in its elevated position throughout the time so long as the plunger 118 is supported by the uninterrupted surface of the notched wheel 122, and that during the revolution of this wheel the cutter will descend to its lowest cutting position the instant that the plunger enters the notch 123, and from which it will be elevated as the wheel 122 continues to revolve. It will also be observed that in having the piston for the plunger sleeved on the shaft 121, means are provided for a direct stroke of the plunger notwithstanding its pivotal connection with the cutter frame.

One of the important features of my invention is that I supply the paste to webs of paper by pressure and for which purpose the paste is contained, see Fig. 1, in one or more tanks 124, depending from the bottom of which is a piston cylinder 125, provided with a piston 126, and a piston rod 127, as indicated by dotted lines in Fig. 1, to which cylinder air is supplied from any suitable source (not shown) by means of a pipe 128, the upper end of which piston rod 127 projects through and has a bearing in the bottom plate or wall 129, and projecting into the paste tank, has secured on its upper end a piston 130, for which the walls of the paste tank provide a cylinder, both of these pistons being provided on their peripheries with packings ordinarily employed for rendering them respectively air and paste tight.

With the construction above described it is at once apparent that means are provided by which air pressure may be utilized for supplying paste from a tank and discharging it in thin ribbons upon the webs of paper in the absence of producing any bubbles in the paste, defeating the uniformity in delivery of the several ribbons of paste on the paper and likewise its distribution over the surface of and into the fibers of the paper, as would otherwise occur.

Although the drawing, indicates in Fig. 1 a separate paste tank and air pressure cylinder for the rolls of backing paper, and another paste tight tank and air pressure cylinder for the rolls of tissue paper, it is apparent that the use of a single tank and air pressure cylinder would not be a substantial departure from my invention. These tanks 124 (see Figs. 1, 3 and 9) are connected by means of headers 131, provided with suitable couplings 132, by means of branch pipes 133, and couplings 134 with the several nozzles, each branch pipe is also provided (see Fig. 3) with a valve 135, provided with a screw cap 136 of any ordinary construction manipulated by a handle 137 for cutting off the supply of paste from the paste tanks to any one or more of the nozzles, and also if desired, for regulating the supply of paste to individual nozzles.

Any suitable source of power may be utilized for actuating the driving mechanism of the machine now to be described, as for example, an electric motor 138 (see Fig. 1) on the end of the power shaft 139 of which (see Figs. 2 and 4) is a worm 140, meshing with a worm wheel 141, on the drive shaft 142 journaled at its ends in boxes 143, supported by the side bars of the base frame 18 of the machine.

On the outer projecting end of the drive shaft 142 is a bevel gear wheel 144 meshing with a beveled pinion 145 on a shaft 146, which shaft extends horizontally to the front end of the machine, on each lower pressure roll 47 is a worm 147 engaging a worm wheel 148 on the outwardly projecting end of the shaft 149 of the lower pressure roll 47.

Inwardly of the frame of the machine on shaft 149 is a gear wheel 150 meshing with a gear wheel 151 on the upper and adjustable pressure roll 46, in turn meshing with a pinion 152 (see Fig. 5) on a stud 153 projecting from the bracket frame 37. Meshing with the pinion 152 is another pinion 154 on a stud 155 meshing with a gear wheel 156 on the shaft of the lower draw roll 45ª, which latter gear wheel in turn meshes with a pinion 157 on the upper draw roll 45. With the several banks of pressure and draw rolls thus positively in gear connection with the drive shaft, it will at once be apparent that the several rolls may be revolved at identically the same speed, and whereby a uniform tension of the several sheets of paper individually and collectively may be maintained throughout their passage beneath their several adjacent paste nozzles, and reciprocating brushes.

On the drive shaft 142 and adjacent the beveled pinion 144 is a crank wheel 158 provided with a radial slot 159, which (see Figs. 2 and 4) extends entirely across it, and in which slot is secured a crank pin 160 adjustably secured by means of a head thereon conforming to the slot, and a clamping nut 161. Upon the crank pin 160 is pivoted a pitman 162, which pitman extends upwardly and is pivoted to a sliding bar provided at intervals thereof adjacent the ends of each pair of brushes with a rack 164 (see Figs. 2, 3, 7 and 8) meshing with and reciprocating a pinion 165, secured to a pin 166, to which there is also secured above the pinion a gear wheel 167.

Projecting from each brush holder are rack bars 168 on the inner ends of which the brush holders are sleeved and free to be turned toward and from their operative position by means of a pin 168ª, secured to the rack bar and projecting through an elongated slot 168ᵇ in the brush holder. Both of these rack bars are engaged and actuated by the gear wheel 167, and whereby the brushes are alternately reciprocated across the paste on the surface of the passing web of paper, and thereby distribute the ribbons of paste applied thereto, and at the same time forcibly brush it into the fiber of the paper as before described.

The pin 156 is secured to the frame of the machine by a lock screw 169, as indicated by dotted lines in Fig. 8, and for isolating the gear wheels from contact with the operator of the machine, there is provided a removable cap 170 removably secured in its operative position by a screw 171, passing therethrough into the upper end of posts 171ª.

The adjustment of the crank pin 160 in the slot 159 of the crank wheel, provides a means for adjusting the stroke of the pitman 162, and thereby simultaneously the length of stroke of all the brushes to adapt them for webs of paper differing in width, and in this connection it may be noted that the slot 159 in the crank wheel 158 need but to extend from the axis of the wheel to the periphery thereof, and is only shown as extending entirely across the wheel for the reason that thereby its formation is more convenient.

As a means for actuating the shaft 121 for the cutter 116 there is on the drive shaft 142 a worm 172 engaging a worm wheel 173. On the shaft 174 (see Fig. 4) is a bevel gear 175 meshing with a bevel pinion 176 secured upon a shaft 177 journaled at its opposite end in the sides of the base frame parallel with and below the drive shaft 146, and connected with the shaft 121 by a clutch consisting of two gears 178 and 179, sleeved on the shaft 177 on which between said gears is a slidable clutch member 180 for throwing into operation either one of said gears to the exclusion of the other, for the convenience of the operation of which clutch there is secured thereto a rod 180ª projecting well toward or beyond one side of the machine provided with a suitable handle 180ᵇ. Gear wheels 178 and 179 respectively mesh with pinions 181 and 182 fixed on the shaft 121, and whereby said shaft is actuated to operate the cutter as before described, for severing the made continuous flong into lengths. This differential gear connection between the shafts 121 and 177 provides a means varying the time of the cutting stroke of the cutter, and accordingly the length of the flongs cut from the completed continuous web.

As a means for automatically, simultaneously cutting the discharge of paste from the several nozzles, concurrently with and at the instant the several operating guides and rolls of the machine for the strips of paper cease, the drive shaft 142 has also thereon a bevel pinion 183 (see Figs. 2, 4 and 10) engaging a pinion 184 on a governor shaft 185 having a shoulder 186 seated in a corresponding recess in a hub 187 of a bracket 188, secured to the cross bar of the machine by a bolt passing through a perforation 189 therein.

Surrounding and secured to the governor shaft 185 by a bolt 190 passing therethrough is a cross-bar 191, from the opposite ends of which are pivotally suspended balls 192—192 by means of bars 193—193, each of which are provided at their upper ends with inwardly projecting arms 194 to the inner ends of which in turn are pivoted links 195 notched at their free ends to engage a head 196 projecting from and surrounding a hub 197 slidable upon the shaft 185 together with a casing 198, the top of which is also provided with a hub 199, sleeved on the shaft 185. The casing 198 is provided at its opposite sides with slot 200 forming elongated bearings for the bars 193, and as a result of which during the operation of the governor balls, the casing is rotated on the governor shaft 185, and is normally held at the limit of its upward movement when the balls are at rest, by means of a spring 201, coiled around a bolt 202 screw-threaded in the shaft 185. The upper end of the spring abuts against the hub 197, and the other end against the flat head 203 of the bolt, and whereby on screwing the bolt up or down in the governor shaft the tension of the spring is accordingly increased and diminished, and adjustable to wear as well. The spring is inclosed by a casing 204, open at its bottom end, and forming a bearing surface for the head of the bolt, the upper end being secured in the hub 197, by projecting it into an annular recess therein, as clearly shown in Fig. 13.

Sleeved upon the hub 199 of the governor casing and confined in an annular groove in the hub is a ring 205, from which radially projects an arm 206 supporting an upright bar 207, the upper portion of which is provided with rack teeth as shown in Fig. 3, the rack bar 207 being rigidly secured in the arm 206 in its operative position by any suitable means as for example, by screw-threading it therein as indicated at 208. Toward its lower end the rack bar projects through and has bearing in an arm 208ª projecting from the hub 187, an upper bearing being provided for by means of a fixed slotted bar 207ᵇ, by means of which bearing the rack bar is maintained in mesh with the pinion 209. As an additional means for guiding the rack bar 207 in its path of movement a pin 208ᶜ is screwed into the bar 206, see Fig. 13, and projecting through has a bearing in the arm 208ª, the use of which pin, however, for this purpose may ordinarily be dispensed with. Rack bar 207 meshes with the pinion 209 secured on a short shaft 210, which, see Fig. 4, is journaled at its ends in suitable bearings 211 projected from the bracket 188, and having on its outer end a gear wheel 212, meshing with a rack 213 on a sliding bar 214 to which is pivoted the crank arm on the shaft 52 of every paste nozzle.

With the mechanism of the machine at a standstill the governor balls hang in the vertical position shown in full lines in Figs. 2 and 13, at which time the rack bar 207 is at the limit of its upward stroke, and the shaft 52 of the nozzle in a position with its slot out of register with the discharge openings in the nozzle. Connected however, as are the governor balls with the drive shaft and with the oscillating shaft of the several paste nozzles as hereinbefore described, it will be seen that as the speed of the machine is fast or slow, the discharge of the paste from these nozzles will be accordingly greater or less, for example, when the machine is being run at its maximum speed the governor balls will be at the limit of their outward movement, and the shaft 52 in a position for the discharge of a maximum volume of paste from the nozzle, and that following this as the speed of the machine is decreased and the governor balls are accordingly lowered the shaft 52 will be moved to a position accordingly narrowing the discharge opening therefrom for the paste. In this connection it may be again noted that the blades 69 predetermine by their adjustment the initial thickness of the ribbons of paste discharged from the nozzle, and that the governor operates through its connection with the slotted shaft 52 to maintain this thickness throughout variations in the speed of the machine, with the result that having once determined the desired thickness of the ribbon of paste by the adjustment of the blades 69, this predetermined thickness of paste will be delivered to the several webs of paper as slow or as fast accordingly as the speed of the machine.

Having described my invention, what I claim and desire to secure by Letters Patent is:

1. A flong machine comprising in combination a plurality of non-rotatable swinging supports for and extending at intervals across a corresponding number of moving fibrous strips in contact respectively therewith, adapted to adjust and direct said several strips in the same path of movement.

2. A flong machine comprising in combination a number of swinging guides, individually projecting across to contact with as many moving webs of material directed through the machine in differing planes, and whereby said guides are adapted for adjusting the adjacent edges of the several webs to and maintain said edges in a predetermined lateral path of movement common to all.

3. A flong machine comprising in combination non-rotatable guide rods pivoted at one end, and extending across and in frictional contact with the surface of moving webs of paper, whereby said guide rods have a swinging movement and exert a frictional resistance adapted to vary at will the path of movement of the web through the machine in the quickest possible time.

4. A flong machine comprising in combination non-rotatable horizontally swinging guide rods pivoted at one end, extending across, and means forward of and for maintaining said rods in contact with the opposing surface of webs of paper descending therefrom, and whereby on shifting of the angle of said rods, the subsequent path of movement of the webs may be varied and accordingly adjusted and thereafter be maintained in the same path during their onward movement through the machine.

5. A flong machine comprising in combination guide rods extending transversely of and in contact with as many webs of moving paper conducted thereto along varying paths, and means for severally swinging said guide rods to a position whereby said webs are directed onwardly therefrom in a lateral path of movement common to all.

6. A flong machine comprising in combination adjustable non-rotatable swinging guide rods for webs of paper passing in contact therewith and fixed guide rods opposed thereto.

7. A flong machine comprising in combination opposing draw rolls, one of which is adjustable for a single web and a plurality of webs of paper passing between said rolls, and a pair of adjustable pressure rolls for varying their pressure upon the web and webs of paper conducted therethrough, one of which pressure rolls is milled toward its opposite ends for gripping the selvage edge of the webs of paper passing therethrough against the opposing roll.

8. A flong machine comprising in combination a pair of draw rolls for feeding a web of paper, a pair of pressure rolls to and between which the web of paper is directed by the draw rolls, means for adjusting both pairs of said rolls, and means for maintaining the movement of both pairs of rolls at the same speed, whether fast or slow.

9. A flong machine comprising in combination means for directing paste to contact with a moving fibrous strip, and means for applying the paste thereto by a mechanical pressure to the exclusion of air.

10. A flong machine comprising in combination means for directing paste to contact with a moving fibrous strip, means for applying the paste thereto by a mechanical pressure to the exclusion of air, and means for regulating said supply.

11. A flong machine comprising in combination a paste reservoir, a nozzle adapted to discharge paste therefrom upon a passing fibrous web, and means for applying a mechanical pressure directly to the contents of said reservoir.

12. A flong machine comprising in combination a nozzle, means for delivering the ribbons of paste therefrom upon a passing web of fibrous material, and mechanical means for applying said ribbons under pressure, and whereby air bubbles are excluded therefrom.

13. A flong machine comprising in combination a nozzle, provided with a number of paste receptacles, a corresponding number of blades directing the paste from said receptacles upon the surface of the passing web of paper in ribbon like form, and means for adjusting said blades for varying the thickness of the applied ribbons of paste.

14. A flong machine comprising in combination a nozzle, provided with a discharge opening longitudinally thereof, a movable shaft therein provided with a number of narrow slots through which paste is discharged upon a moving web of paper below the nozzle, and an adjustable blade for each shaft slot whereby the thickness of the ribbons of paste discharged upon the web of paper may be varied.

15. A flong machine comprising in combination a drive shaft, a nozzle, an oscillating shaft for controlling the discharge opening of the nozzle, a governor, means connecting the governor with the drive shaft, and with the oscillating shaft, whereby the volume of material discharging from the nozzle varies with the speed of the machine, and is automatically discontinued on the cessation of the operation of the machine.

16. A flong machine comprising in combination a drive shaft, a nozzle provided with an elongated discharge opening, an oscillating shaft provided with a number of slots therethrough adapted to register with the discharge opening of the nozzle, a governor, and means connecting the governor with the drive shaft and with said oscillating shaft.

17. A flong machine comprising in combination a nozzle, an inlet therefor, for the supply of materials thereto, deflecting plates in the path of the material discharging from said inlet, and means for adjusting said plates whereby said materials may be uniformly distributed throughout the nozzle and discharged therefrom.

18. A flong machine comprising in combination a nozzle provided with an elongated discharge orifice, an oscillating shaft therefor provided with a number of slots adapted to register with the discharge orifice of the nozzle, means for moving the slots in said shaft out of register with the discharge orifice of the nozzle, means for oscillating said shaft, and means for disconnecting the shaft from its oscillating means, whereby the nozzle is conveniently removable for cleansing purposes.

19. A flong machine comprising in combination a nozzle, means for discharging paste from said nozzle under forced pressure upon an opposing fibrous strip, and a reciprocating brush whereby paste is uniformly distributed over the surface of said strip and forced into the fibers thereof.

20. A flong machine comprising in combination a drive shaft, reciprocating brushes, an opposing table, means for individually adjusting said brushes toward and from the surface of said table, means for reciprocating said brush across said table, and means for connecting the brushes with said drive shaft.

21. A flong machine comprising in combination a table for supporting a passing web, a movable brush opposing said table, means for reciprocating said brush connected with and actuated by the drive shaft of the machine, and means whereby said brush may be swung upwardly away from its operative position for the inspection of the brushing surface thereof.

22. A flong machine comprising in combination a movable brush, means for mechanically reciprocating said brush, means whereby said brush may be swung on a fixed axis upwardly out of its operative position, and means for removably locking the brush in its elevated position.

23. A flong machine comprising in combination a brush holder, a brush removable therefrom, and means for concurrently reciprocating the brush with said holder.

24. A flong machine comprising in combination a brush holder, provided with journals at its opposite ends, and suitable bearings therefor, a brush suspended by and movable on said holder, a rack bar secured at one end to the brush, a mechanism for operating said rack bars, whereby the brush is reciprocated on the holder and may be swung upwardly away from its operative position.

25. A flong machine comprising in combination a table supporting a movable web, having a viscous material applied thereto, a reciprocating brush opposing said table, means for actuating said brush, under-cut plates secured to the opposite sides of said table and projecting over the respective edges of the web, whereby said edges are isolated from contact with the brush, and from said viscous material, and the latter is uniformly spread over the surface of the web contacting therewith.

26. A flong machine comprising in combination a nozzle for discharging a viscous substance upon an opposing passing web, means for supplying said material under air pressure to the nozzle from a suitable source, and means isolating the air for said pressure from contact with said material.

27. A flong machine comprising in combination a plurality of nozzles discharging their contents upon the surface of a web opposed thereto, a supply tank connected with said nozzles severally, a piston cylinder in a plane below said tank, pistons respectively for the tank and said piston cylinder, and a piston rod common to the piston of both the tank and the cylinder.

28. A flong machine comprising in combination a drive shaft, means for separately and collectively conducting through said machine webs of paper, and means for applying paste to but one and the upper surface of each of the several webs.

29. A flong machine comprising in combination a drive shaft, means for separately and collectively conducting therethrough webs of paper, means for applying paste to but one and the upper surface of each of the several webs, means for uniformly distributing the applied paste over the surface of said several webs, a cutter for severing the completed flong into lengths, and means connecting said several means with said drive shaft, whereby they are simultaneously operated and in synchronism with each other.

In witness whereof, I have hereunto set my hand and affixed my seal, this 5th day of February A. D. 1915.

JOSEPH P. RIVETT. [L. S.]

Witnesses:
MILDRED ELSNER,
JNO. G. ELLIOTT.